United States Patent Office 3,475,478
Patented Oct. 28, 1969

---

3,475,478
2-SILA-1,4-DIOXAN COMPOUNDS AND PRODUCTION
Walter Simmler, Cologne-Muelheim, Germany, assignor to Farbenfabriken Bayer Aktiengesellschaft, Leverkusen, Germany, a corporation of Germany
No Drawing. Continuation-in-part of application Ser. No. 280,448, May 14, 1963. This application Sept. 6, 1967, Ser. No. 665,737
Claims priority, application Germany, May 25, 1962, F 36,904
Int. Cl. C07d $103/02, 103/04$
U.S. Cl. 260—448.8      10 Claims

---

ABSTRACT OF THE DISCLOSURE

Novel 2,2-dimethyl-2-sila-1,4-dioxan derivatives are disclosed as well as a method of preparing them. The derivatives correspond to the formula:

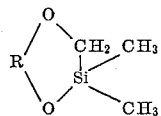

wherein R is a bivalent radical having at least 2 carbon atoms and can be a cyclic radical, two adjacent carbon atoms of which are linked to one of the oxygen atoms of the siladioxan.

The 2,2-dimethyl-2-sila-1,4-dioxan derivatives are prepared by reacting a dimethyl-(bromomethyl)-silane selected from the group consisting of dimethyl-(bromomethyl)-alkoxysilane and dimethyl-(bromomethyl)-chlorosilane, the latter in the presence of a tertiary nitrogen base in an amount stoichiometrically equivalent to the chlorine, with an equimolar amount of an organic diol selected from the group consisting of ethylene glycol, o-dihydroxycyclohexane, pyrocatechol, to form dimethyl (bromoethyl)-β-hydroxyorganooxy-silane and slowly adding to the said dimethyl (bromomethyl)-β-hydroxyorganooxy - silane at a temperature of up to 150° C. a tertiary nitrogen base in an amount stoichiometrically equivalent to the bromine.

The compounds of the invention are characterized by the presence therein of Si-O-C bonds which can be relatively easily split, thus making them highly useful as intermediates and particularly as intermediates in the preparation of resins.

---

This application is a continuation-in-part of application Ser. No. 280,448 filed May 14, 1963, now abandoned.

The invention relates to new derivatives of 2,2-dimethyl-2-sila-1,4-dioxan substituted in the 5- and 6-positions, and to an advantageous process for the production of the last-mentioned compounds and its derivatives. The novel compounds correspond to the formula:

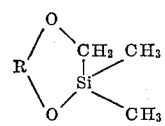

wherein R is a bivalent radical having at least 2 carbon atoms, that is to say in the simplest case the group —CH$_2$—CH$_2$— wherein the hydrogen atoms may be replaced by hydrocarbon radicals. Furthermore, R may also be a mono- or poly-nuclear cyclic, and preferably aromatic radical, two adjacent carbon atoms of which are linked with one oxygen atom of the siladioxan, for example, according to the formula:

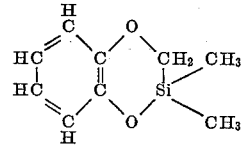

of the benzo-2,2-dimethyl-2-sila-1,4-dioxan. The oxygen-linked o-phenylene radical may be replaced by a polynuclear, and preferably a condensed ring system, for example that of naphthalene or anthracene. The cyclic radicals may also carry further substituents which do not interfere with the reaction, the trifluoro-methyl-mercapto group being mentioned as an example.

Of the 2-sila-1,4-dioxan compounds, only the 2,2-dimethyl-2-sila-1,4-dioxan substituted in the 2-position has hitherto been known. It has been produced from dimethyl-(chloromethyl)-chlorosilane by a combination of the ether synthesis according to Williamson and the chlorosilane esterification with monosodium glycolate. This method of production is cumbersome and not very rewarding, since the bulk of the glycol is esterified or etherified at both COH groups and thus excluded from the desired reaction, i.e., esterification at one COH group and etherification at the other COH group. Moreover, the excess of glycol required for this purpose can be removed only by a lengthy process during which it reacts with the ether ester to be obtained, with transesterification, so that only between 30 and 35% of the theoretically possible yield can be attained.

It has now been found that 2,2-dimethyl-2-sila-1,4-dioxan and its homologues, and the cyclic derivatives thereof, can be produced in a very convenient manner by reacting a dimethyl-(bromomethyl)-alkoxysilane or a dimethyl-(bromomethyl)-chlorosilane, the latter in the presence of an amount of a tertiary nitrogen base which is stoichiometrically equivalent to the chlorine, with the equimolecular amount of an aliphatic or aromatic compound containing two adjacent carbinol groups, to give dimethyl-(bromomethyl)-(β-hydroxy-organooxy) - silane, and slowly adding to the latter, at an elevated temperature, an amount of a tertiary nitrogen base which is stoichiometrically equivalent to the bromine. Since solid salt separates out in the process, the reaction is preferably carried out in the presence of an inert solvent the boiling point of which enables a sufficient speed of the reaction to be attained which becomes noticeable already at room temperature, but at the same time enables a satisfactory separation from the reaction product by distillation to be carried out.

Some examples of compounds having two adjacent carbinol groups are ethylene glycol and pyrocatechol. As substitution products of the latter there may be used, for example, 1,2-dihydroxy-3-alkoxybenzenes and analogous compounds such as 1,2-dihydroxy-4-(trifluoromethylmercapto)-benzene. Triethylamine is a particularly suitable nitrogen base for binding the hydrogen bromide which is split off during the condensation reaction of the silicon-bonded bromethyl group with the free hydroxyl group of the same molecular with ring closure.

When carrying out the process, a distillation of the compounds formed in the first step, for example, of the ethylene glycol monoester or pyrocatechol monoester of dimethyl-(bromomethyl)-silanol is to be omitted, since this would lead to losses due to internal transesterification according to the reaction scheme

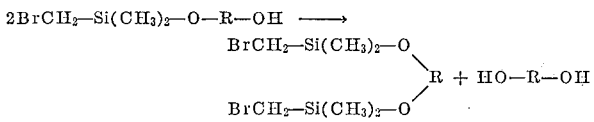

The principle of an etherification reaction according to the scheme

≡C.OH+BrCH$_2$.Si≡→C.O.CH$_2$.Si≡ +HBr is known. Accordingly, in the case of exclusively bifunctional reaction components, a condensation to silapolyethers, i.e., in this case polymeric oxymethyl silanol esters of the formula

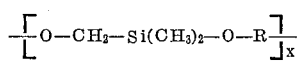

was to be expected. It is therefore most surprising that, instead, cyclic monomers are obtained in high yields.

Since the Si-O-C bonds of the latter can comparatively readily be split, the products of the process according to the invention, being well-defined compounds, are highly suitable for the introduction of silicon into organic compounds and for the production of organo-poly-siloxanes having specifically dosed carbofunctional units. Thus, for example, during hydrolysis hydroxy-organosilanols are formed as intermediates which are then either condensed as such to form polysiloxanes, or if other silanols, alkoxysilanes, siloxanols or alkoxy-siloxanes are present, co-condensed with the latter. High polymeric organo-siloxanes which should contain only a small number of organooxymethyl substituents can thus readily be produced by the known methods of co-hydrolysis. On the other hand, an etherification of high polymeric bromomethyl-substituted siloxanes would only proceed slowly and, due to the long duration of the reaction, require substantially higher economic expenditure.

Thus hydrolysis and condensation effected in the known manner leads to the production of compounds of the type HO—R—O—CH$_2$—Si(CH$_3$)$_2$—
   O—SI(CH$_3$)$_2$—CH$_2$—O—R—OH (R as defined above), which compounds are modified bis-hydroxy-organo tetramethyl disiloxanes and which are therefore analogues of glycols in the sense as described in U.S. Patent 2,527,591; column 3, lines 40 to 47. As indicated in this reference, such polyhydric alcohols having siloxane moities can be utilized for the production of a great number of synthetic resins and the like. This may be readily seen from U.S. Patents 2,527,590 (column 1, lines 11 to 29); 2,611,777; 2,645,630; 3,243,475 (column 2, lines 6 et seq., especially lines 25 and 26 with X' or modified X'=R as defined above) corresponding to prior published French patents 1,291,937 and further from German patents 1,114,632 (when the symbol X therein means the ether modified bivalent radical R as defined above, and Y means —OH); 1,122,698 (column ¾, lines 1 et seq. with Y=O, Z=OH, and Y—CH$_2$—CH$_2$—Z optionally modified as defined in the application above for R; 1,150,516 (column 1, lines 22 et seq. with Y=O, Z=OH, R" modified to be equal to R of the application). The subject matter of the two latter patents have been combined and also published in Belgian patent Specification 604,814. The resulting silicon containing resins, i.e., produced from the starting materials of the invention, have the same fields of application as those resins described in the patent literature.

The products of the process according to the invention can also be used as solvents and plasticizers in special cases.

The following Examples are given for the purpose of illustrating the invention.

EXAMPLE 1

2,2-dimethyl-2-sila-1,4-dioxan

A mixture of 150 g. (0.75 mol) of dimethyl-(bromomethyl)-ethoxysilane of 98.1% by weight purity, 46.6 g. (0.75 mol) of 1,2-dihydroxy ethane and 200 cc. of 1,4-diisopropyl benzene was heated to 150° C. and a weak current of dry nitrogen was then passed through this mixture for 2 hours. 34.4 g. (0.75 mol) of ethanol were thereby collected in a connected cooling trap.

To the remaining solution of 1-hydroxy-2-[dimethyl-(bromomethyl)-siloxy]-ethane there were added according to the invention, again at 150° C. in the course of 3 hours, dropwise 76 g. (0.75 mol) of triethylamine, and the heating continued for a further 3 hours. The precipitated salt was then separated by filtration. After washing out with benzene and after a practically residue-free sublimation at 162° C./0.2 mm. Hg, it was found to be triethyl ammonium bromide having a content of 43.9 percent by weight of bromine in accordance with theory. The amount of 122 g. of the salt which is separated, washed with benzene and dried, corresponded to about 89% of the theoretically possible quantity.

The filtrate thereof was fractionated under normal pressure, and as fraction going over at 135° C. there was obtained 79 g. of pure 2,2-dimethyl-2-sila-1,4-dioxan of the

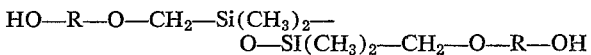

in a yield of approximately 80% of theoretical. Refractive index $n_D^{20}$=1.4288; contents by weight according to elementary analysis: 45.5% C., 9.1% H (calculated for C$_5$H$_{12}$O$_2$Si: 45.4% C., 9.1% H).

| | Proportion of protons | | |
|---|---|---|---|
| | CH$_2$.CH$_2$ | Si.CH$_2$.O | Si(CH$_3$)$_2$ |
| Determined by nuclear-magnetic resonance measuring | 4.0 | 2.0 | 6.1 |
| Calculated | 4 | 2 | 6 |

EXAMPLE 2

Benzo-2,2-dimethyl-2-sila-1,4-dioxan 250 g. of ethanol were added dropwise to 1000 g. of dimethyl-(bromomethyl)-chlorosilane at room temperature within 4 hours while stirring. The mixture was heated under reflux for another 4 hours at boiling temperature, and by subsequent distillation there were obtained 817 g. of a fraction going over at 147° C. of refractive index $n_D^{20}$=1.4438, which according to gas-chromatographic determination consisted of 98.7% by weight of dimethyl-(bromomethyl)-ethoxysilane.

98.5 g. thereof (0.5 mol) were mixed with 55 g. (0.5 mol) of pyrocatechol and 150 cc. of o-xylene, and from the mixture there were distilled off through a column at first 21 g. of ethanol (91% of the theoretical) in the course of 5 hours, and then 50 cc. of o-xylene with the residual ethanol.

According to the invention, a further 100 cc. of o-xylene were then immediately added to the remaining solution of 1 - hydroxy - 2 - [dimethyl - (bromomethyl) - siloxy]-benzene, the solution was heated under reflux to boiling 50.6 g. of thiethylamine (0.5 mol) were added dropwise within 4 hours, and heating continued for a further 3 hours. From the salt precipitated as needles and which consisted, as in Example 1, of triethyl ammonium bromide, the solution was filtered off. The o-xylene was first evaporated therefrom and the residue then fractionated at 0.4 mm. Hg. It passed over almost completely at 66° C. and consisted of 98.8% by weight (according to gas-chromatographic determination) of the benzo-2,2-dimethyl-2-sila-1,4-dioxan of the formula:

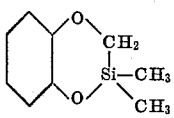

in a yield of 84% of the theoretical.

Refractive index $n_D^{20} = 1.5277$; contents by weight according to elementary analysis: 59.7% C., 6.6% H (calculated for $C_9H_{12}O_2Si$: 60.0% C., 6.6% H).

|  | Proportion of protons | | |
| --- | --- | --- | --- |
|  | $C_6H_4$ | $Si.CH_2.O$ | $Si(CH_3)_2$ |
| Determined by nuclear-magnetic measuring | 4.1 | 2.1 | 6.0 |
| Calculated | 4 | 2 | 6 |

EXAMPLE 3

The same product as that according to Example 2, was obtained in the following way:

To a mixture, cooled with ice, of 165 g. (1.5 mol) of pyrocatechol and 152 g. (1.5 mol) of triethylamine in 500 cc. of o-xylene, 281 g. (1.5 mol) of dimethyl-(bromomethyl)-chlorosilane were added dropwise in the course of 6 hours, the precipitated triethylammonium chloride was filtered off, the filtrate heated under reflux at boiling temperature, another 152 g. (1.5 mol) of triethylamine added dropwise within 6 hours, and boiling under reflux continued for a further 2 hours. The solution was then filtered off from the precipitated triethylammonium bromide, the o-xylene evaporated from the filtrate and the residue fractionated at 0.5 mm. Hg. As fraction going over at 70° C. of refractive index $n_D^{20} = 1.5281$, 207 g. of the benzo-2,2-dimethyl-2-sila-1,4-dioxan described above were obtained.

EXAMPLE 4

(Trifluoromethyl-mercaptobenzo)-2,2-dimethyl-2-sila-1,4-dioxan

According to a process described in detail in copending application Ser. No. 232,299, filed Oct. 22, 1962, in the name of Hans Richert, which application has been assigned to the assignee of this case, the 1,2-dihydroxy-4-(trifluoromethylmercapto)-benzene was obtained by the reaction of trifluoromethyl sulphenyl chloride with pyrocatechol. A mixture obtained in the course of this process contained 60% by weight of the last-mentioned substitution product in addition to 40% by weight of residual pyrocatechol and was used, without further separation, for the process according to the invention in the following way:

47.4 g. of this mixture were stirred with 64.2 g. of triethylamine and 300 cc. of o-xylene. The whole mixture was heated to 50° C., 59.6 g. of dimethyl-(bromethyl)-chlorosilane were added dropwise at the same temperature and with further stirring in the course of 2 hours, and stirring continued at 120° C. for a further 6 hours. The precipitated triethyl ammonium halides were then separated by filtration, in which 98% of the bromine introduced with the silane component and 90% of the chlorine could be detected by titration after dissolution in water.

The o-xylene used as solvent was evaporated from the filtrate, and the residue was fractionated at 0.8 mm. Hg. Approximately 40% by weight passed over at 82° C. and consisted of benzo-2,2-dimethyl-2-sila-1,4-dioxan. As fraction passing over at 116° C. there were obtained 30 g. of (trifluoromethylmercaptobenzo)-2,2-dimethyl-2-sila-1,4-dioxan of the formula

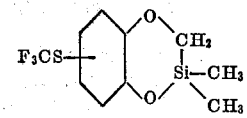

in yield of about 80%, referred to the amount of trifluoromethylmercapto-pyrocatechol in the initial reaction mixture.

I claim:
1. A 2,2-dimethyl-2-sila-1,4-dioxan derivatives of the formula:

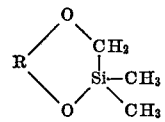

wherein R is an o-phenylene radical linked with each of two adjacent carbon atoms to one of the oxygen atoms of the siladioxan.

2. A 2,2-dimethyl-2-sila-1,4-dioxan derivative according to claim 1 designated

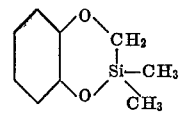

3. A 2,2-dimethyl-2-sila-1,4-dioxan derivative having the formula:

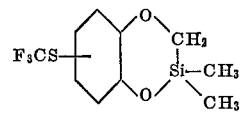

4. The process which comprises reacting a dimethyl-(bromomethyl)-silane selected from the group consisting of dimethyl(bromomethyl)-alkoxysilane and dimethyl-(bromomethyl)-chlorosilane, the latter in the presence of a tertiary nitrogen base in an amount stoichiometrically equivalent to the chlorine, with an equimolar amount of an organic diol selected from the group consisting of ethyleneglycol, o-dihydroxycyclohexane, and pyrotechol, to form dimethyl (bromomethyl)-(β-hydroxyorganooxy)-silane and slowly adding to said dimethyl-(bromomethyl)-(β-hydroxyorganooxy)-silane at a temperature of up to 150° C., a tertiary nitrogen base in an amount stoichiometrically equivalent to the bromine and recovering a cyclic monomeric compound.

5. Process according to claim 4 wherein said organic diol is a member selected from the group consisitng of hydrocarbon-substituted, ethylene glycol, 1,2-dihydroxynaphthalene, 2,3-dihydroxynaphthalene, 1,2-dihydroxanthracene, 2,3-dihydroxyanthracene, and trifluoromethyl-mercapto-o-dihydroxy benzene.

6. Process according to claim 4 wherein said reaction is effected in the presence of an inert solvent.

7. Process according to claim 4 wherein said tertiary nitrogen base is triethylamine.

8. Process according to claim 4 which comprises reacting dimethyl-(bromomethyl)-ethoxysilane with pyrocatechol to form 1-hydroxy-2-[dimethyl-(bromomethyl)-siloxy-benzene and slowly adding to the latter at a temperature of up to 150° C. triethylamine in an amount stoichiometrically equivalent to the bromine.

9. Process according to claim 4 which comprises reacting dimethyl-(bromomethyl)-chlorosilane with pyrocatechol in the presence of triethylamine in an amount stoichiometrically equivalent to the chlorine to form 1-hydroxy-2-

[dimethyl(bromomethyl)-siloxyl]-benzene and slowly adding to the latter at a temperature or up to 150° C. triethylamine in an amount stoichiometrically equivalent to the bromine.

10. Process according to claim 4 which comprises reacting 1,2-dihydroxy-4-(trifluoromethylmercapto)-benzene with dimethyl-(bromomethyl)-chlorosilane in the presence of triethylamine in an amount stoichiometrically equivalent to the chlorine, and recovering (trifluoromethylmercaptobenzo)-2,2-dimethyl-2-sila-1,4-dioxan.

References Cited

Simmler, Berichte der Deutschen Chemischen Gesellschaft, vol. 96, Jan. 21, 1963, pp. 349–56.

TOBIAS E. LEVOW, Primary Examiner

P. F. SHAVER, Assistant Examiner

U.S. Cl. X.R.

252—364; 260—2, 46.5